Dec. 30, 1952 W. NIPKEN 2,623,440
UNITARY WORK HOLDER
Filed Oct. 31, 1945 3 Sheets-Sheet 1
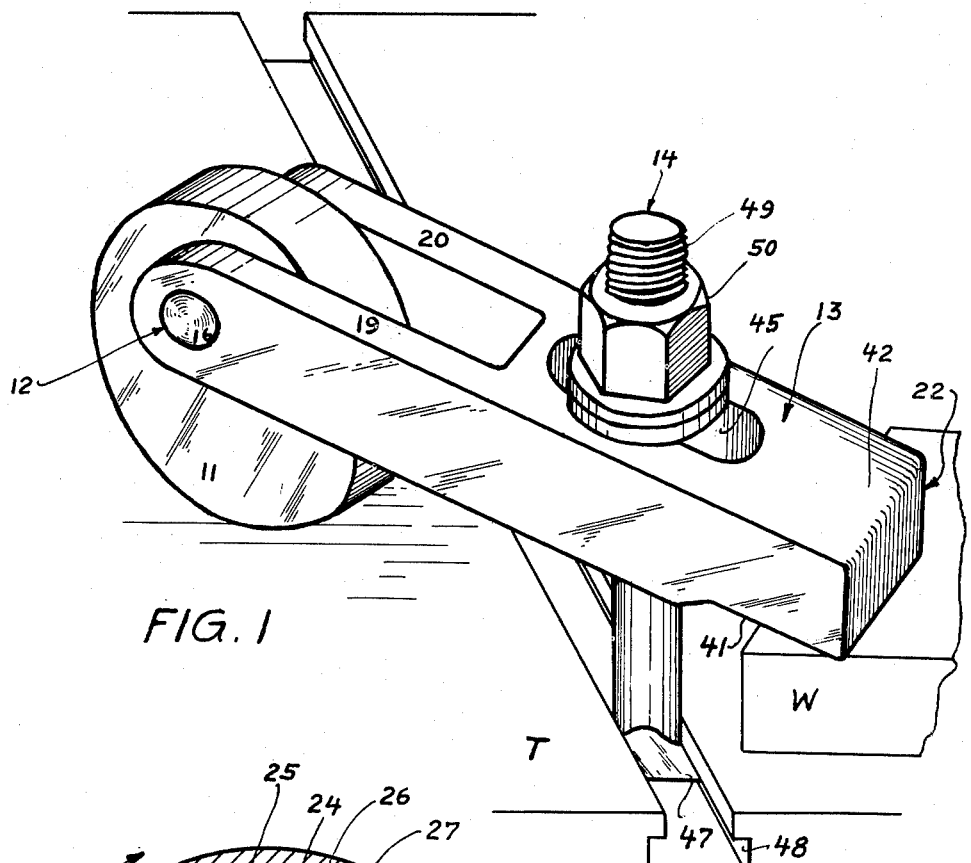
FIG. 1
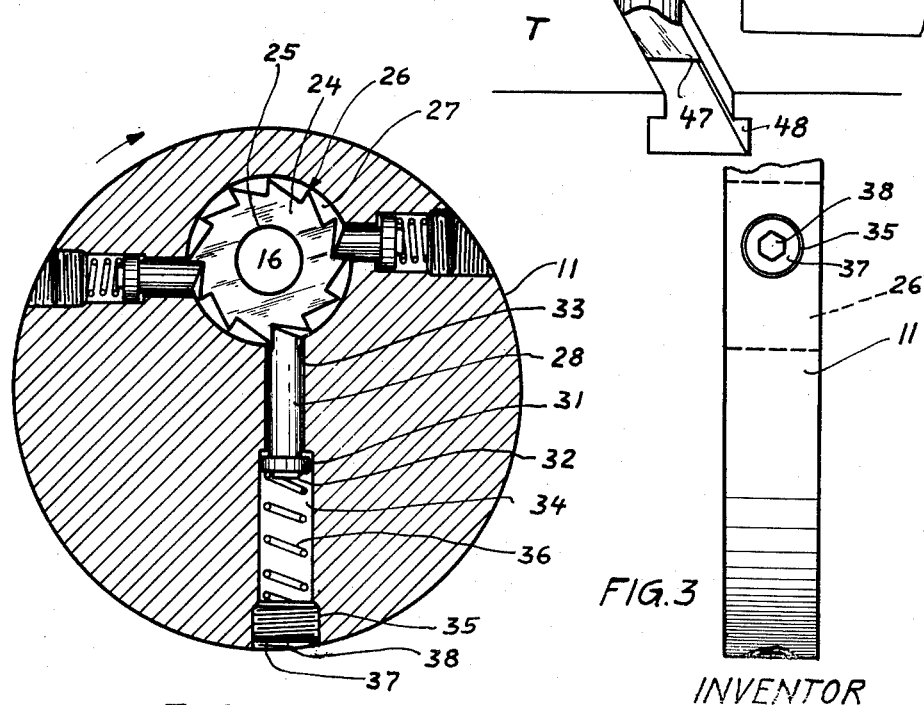
FIG. 2
FIG. 3
INVENTOR
WALTER NIPKEN
BY Dec. 30, 1952  W. NIPKEN  2,623,440
UNITARY WORK HOLDER
Filed Oct. 31, 1945  3 Sheets-Sheet 2

INVENTOR
WALTER NIPKEN
BY *Warren Dunham Foster*

Dec. 30, 1952 W. NIPKEN 2,623,440
UNITARY WORK HOLDER
Filed Oct. 31, 1945 3 Sheets-Sheet 3

INVENTOR
WALTER NIPKEN
BY

Patented Dec. 30, 1952

2,623,440

UNITED STATES PATENT OFFICE 2,623,440

UNITARY WORK HOLDER

Walter Nipken, Fairlawn, N. J., assignor to Warren Dunham Foster, Eustis, Fla., and Ridgewood, N. J., as trustee Application October 31, 1945, Serial No. 625,860

22 Claims. (Cl. 90—59)

This application is a continuation-in-part of my application Serial Number 597,353 filed June 4, 1945, and now Patent No. 2,499,408, granted March 7, 1950, and represents an improvement thereover. In my parent application I present a sturdy and relatively inexpensive work holder and clamping tool which maintains a work piece in a predetermined position upon a machine table. By means of that invention a workman may immediately lock in a desired position a piece of metal or other material upon which a machining or other similar operation is to be carried out. That tool is so constructed that it can be easily adjusted successively to hold properly in place a plurality of work pieces of different sizes. The present invention accomplishes all of the results of its parent invention but is even more simple in operation and more easy to adjust. Unlike my former invention it has no loose parts since the necessary clamping and positioning instrumentalities are permanently and adjustably connected during their use but in such manner that the clamping instrumentality may be instantly moved to a plurality of successive elevations above a work table. This tool is positive, firm and does not mar a work table or work piece.

As it has been explained in my parent application a holder of this improved type as well as its predecessor is applicable to almost all common types of machines (often termed "machine tools") which are used to change the form of metal and other materials, such for a few examples only, as milling machines, planers, grinders, shapers, boring mills, presses, jig borers, face plates, and jigs and fixtures. Either the present or predecessor invention is a complete substitute for specially constructed or step blocks or various clamps improvised by means of bolts, blocks, plates and shims in various time consuming and annoying operations. The use of this invention requires very much less time in setting up a machining operation and makes for greater certainty of results.

Essentially this invention provides a positioning member in the form of a disc or other formation of relatively greater height than breadth, a clamping bar associated therewith, and a one way clutch for adjustably connecting one end of the clamping bar with the positioning formation at a point other than its center, the other end of the clamping bar being adapted to engage a work piece. This connection is so constructed and arranged that the positioning member may be rotated freely in one direction but is held locked against rotation in the other direction. A workman can freely rotate the positioning disc but movement cannot be communicated to the disc by the clamping bar. Due to the off-center location of the connection between disc and bar such rotation brings the point of connection to different heights above the table with which my work holder is to be employed and hence instantly adapts it to use with work pieces of different vertical dimensions.

I provide three different types of one-way clutches, all of which, so far as I am aware, are novel in a combination such as this or for such a purpose. Any desired and practical connection of the above characteristics can be employed within the scope of my broader claims.

In practice I have found that a ratchet and pawl, of a simple and novel type, furnishes a most effective connection. According to this construction a workman grasps the clamping member in one hand and rotates the positioning member with the other. This rotation moves the cylinder, if the positioning member is in the form of a disc, eccentrically in relation to the clamping bar thus placing the clamping bar following continued rotation of the positioning member at as many different elevations above the surface of the cylinder which engages a work table as there are teeth in the ratchet. After the positioning member has been rotated so that when it is placed upon the table the clamping bar will engage the work piece and pass therefrom to the cylinder in a line substantially parallel to the bed of the table the tool is ready for use. This necessary adjustment is a matter of a very few seconds. There remains only to fasten a holding bolt, furnished with the table and passing through an appropriate horizontal slot in the clamping bar.

Alternatively I may employ a novel connection wherein a latching disc is placed in an opening in a positioning member, shown as a disc, the axis of the latching disc being that of its opening and the axis of the opening being parallel to but spaced from that of the positioning disc. This latching disc carries a series of spring pressed plungers operating in slots leading from the cylindrical edge of the latching disc and cooperating with shoulders or stops formed in the periphery of the opening, these stops being so shaped and so disposed in relation to adjacent cam surfaces that they engage the heads of plungers when the positioning disc is rotated in one direction but not in the other.

Another one-way connection or clutch which I have found most excellent includes a spring so wound about a shaft which joins the clamping bar to the disc that it permits rotation in one direction and prevents it in the other. Such a holding device is immediately responsive and is therefore especially adapted for use with fine work.

One advantage which this improvement has over the parent invention is that all pieces of the work holder are permanently attached when the tool is in position for use. In several forms of the parent application, however, I find it necessary to employ separate pins which must be taken out and inserted each time a new adjustment is to be made and hence may be lost.

An important feature of the present invention is that if desired I may employ a plurality of different positioning members with each of a plurality of different clamping members. For example I may provide one positioning disc which has a ratchet with many fine teeth as is suitable for light and delicate work. For alternative use with heavier work I may provide a positioning disc or polygon having a heavy ratchet with relatively few teeth. Also any one of these discs may be used in combination with different clamping members of the sort described and claimed in my said co-pending parent application. In such instances, however, as I provide a plurality of different work holders made up from different parts each work holder after its two members have been placed together remains so assembled until the parts are separated to be placed in other combinations. That is to say after the combination has once been made the successive adjustments do not require the parts to be removed one from the other.

I illustrate my invention as embodying a positioning member in the form of a disc, but one of any other appropriate cross-sectional configurations may be employed instead, as for example polygonal.

The objects of my invention will be evident from the above general explanation as well as the specific description which follows. These objects include the provision of a simple self adjusting and unitary work holder or clamping tool which may be instantly positioned at any one of the large plurality of different elevations each closely adjacent the next above a work table and when so adjusted firmly and effectively hold a work piece in position without injury to a work table or a work piece. Although I am showing a preferred form only of my invention for purposes of illustration it will be understood that changes can readily be made without departing from the scope of my broader claims or the spirit of my invention.

In the drawings:

Figure 1 is an isometric view of my novel work holder in position.

Figure 2 is a section of a positioning disc of a preferred form.

Figure 3 is an edge elevation of the structure of Figure 2.

Figure 5:
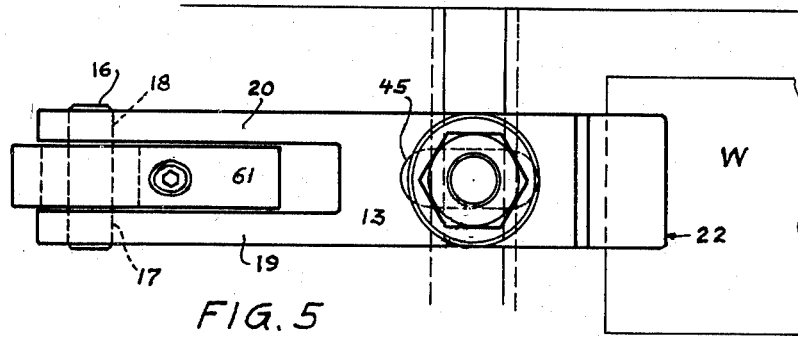
Figure 5 is a top plan view of the subject matter of Figure 4.

In this specification and in the appended claims words denoting position, such as "above" and "below" and "upper" and "lower" and the like, except as noted, are to be taken in relation to a work table of a machine and of a workman using it. The words "inner" and "outer" and the like are to be taken in relation to the center of a positioning member or of an opening formed therein upon an axis parallel to that of the member.

As is clearly evident from Figure 1 my invention consists essentially of a positioning member 11, in the form of a disc, a connection generally indicated as 12 and a clamping bar generally indicated as 13. A holding member generally indicated as 14 cooperates with the end of said clamping bar opposite that which is connected to the positioning member engaging a work piece W placed upon a table T of a machine.

The connecting means include a pin 16 which passes through openings 17 and 18 in tines 19 and 20 of a fork formed in clamping bar 13 at the end opposite its nose or work-engaging end 22 which engages the work piece W. The connection between the pin and openings is that of a pressed fit or a keyway and spline may be provided, so that the clamping bar is fixed upon pin 16 after it has been assembled therewith.

In addition to pin 16 my connecting one way clutch includes a ratchet disc 24 with a central opening 25 and teeth 26 which is placed loosely in an opening 27 in disc 11 which has an axis parallel to but spaced from the axis of the disc. The fit between pin 16 and ratchet 24 is close or fast but alternatively a keyway and spline may be provided. Ratchet and pin are fixed. The clutch is completed by a pawl 28 or preferably a plurality of pawls of which but one need be described since all are essentially alike and mounting means for the pawl or pawls. The ratchet-engaging or toothed end of each pawl is provided with a flat 29 with its surface parallel to the longitudinal axis of the pawl and adapted successively to co-act with each tooth of the ratchet and an inclined surface 30 over which the tooth slides freely. This flat, in combination with other instrumentalities which cooperate with it, is an instrumentality which holds the disc locked against movement which would otherwise be communicated to it by the clamping bar. Near the other end of each pawl I form a collar 31 from which a reduced cylindrical formation 32 extends. From the ratchet-receiving opening 27 to the exterior of the disc there extends a series of aligned and communicating cylindrical openings, one for each pawl. A first or internal opening 33, relatively adjacent the opening within the disc and communicating with it, receives pawl 28 except for its collar 31 and extension 32 which extend within a larger and aligned opening 34, the shoulder formed between the two openings forming a stop with which the collar co-acts. This second or intermediate opening communicates with a third or external and threaded opening 35 again slightly greater in diameter which extends between it and the outside of the disc. A compression spring 36 is placed within the intermediate opening with its inner end resting against the collar 31. A threaded plug 37 with a tool receiving slot 38 may be placed within this outer opening. It will be understood that the axes of the opening for the ratchet and the openings in which the pawls are mounted are normal respectively.

The assembly of the device is very simple. After the ratchet has been placed in its opening a pawl 28 is dropped into the opening adapted to receive it. A spring 34 is placed in the cooperating intermediate opening, the inner end bearing against collar 31, and plug 37 screwed into position. Thus the tooth of the pawl is resiliently held against the ratchet disc. The operation is repeated with the other pawls. The disc with the pawl in position is then placed within the fork of the clamping member and the pin 16 passes through and tightly engages the various transverse openings which are formed to receive it. Thereupon the device is ready for use. It will be realized that the ratchet disc is fixed to the clamp and rotation of the positioning disc relatively to the clamp controlled by engagement between the pawl or pawls and the teeth of the ratchet.

I prefer to employ a plurality of pawls simply to give additional strength and rigidity but if desired only one pawl may be used. Any other one way clutch or means permitting free rotation of disc 11 in one direction only may be substituted as for example those which are later described.

As will be clear from the drawings and as previously stated the clamping member is a single bar 13 with a fork having tines 19 and 20 and a nose 22. As will be clear from a comparison of Figures 1 and 4 and 5 this nose is formed with two work-engaging surfaces 41 and 42 respectively which are so arranged that either can be used to engage and hold a work piece. That is to say a user of my tool may remove the pin 16 from the fork and turn the clamping bar over (rotate it upon its longitudinal axis 180 degrees) thus bringing into work-engaging position the face other than the one previously employed. Since the horizontal distance between each face and the pin 16 is different this reversal of the clamping bar doubles the number of possible positions in which the tool may be placed, all as is more broadly claimed in my parent application.

Figure 4:
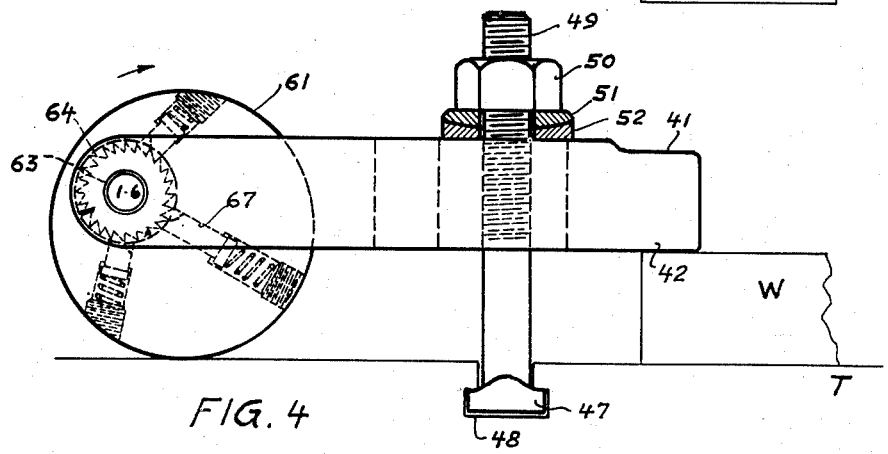
Figure 4 is a side elevation partly in section of the structure of Figure 1 and differs from that of Figure 2 in showing a ratchet with fine teeth.
Figure 6:
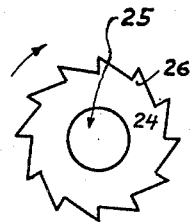
Figure 6 is a fragmentary side elevation showing a ratchet of the type which I may employ.

In a portion of the clamping bar between the fork and the nose I form a vertical slot 45 for the reception of the holding member or bolt 14. This bolt may be provided at its lower end with a T formation 47 which coacts with a correspondingly formed T slot 48 in a bed of the table T. This bolt includes an upper threaded portion 49 for which a nut 50 is provided. Between the nut and the clamp I prefer to use a self-centering device comprising washers 51 and 52 as seen in Figure 4. These washers are formed with cooperatively curved adjacent surfaces but with their relatively distant faces square.

The operation of this form of my device will be clear from a consideration of Figures 1 and 2 or 4 and 5. After the positioning disc and clamping bar have been assembled a workman places the tool upon the table with the bar 13 generally parallel to its bed and nose 41 or 42 as may be desired engaging the work piece and with bolt 14 passing through slot 45. He thereupon holds the clamping bar in one hand and with the other rotates the positioning disc in the direction of the arrow of Figures 2, 4 and 5. Such rotation is entirely free. Plungers 28 pass successive teeth 25. When the workman finds the bar to be parallel to the table he stops the rotation. The workman thereupon tightens the nut 50 with the washers in place. The curved adjacent surfaces of washers 51 and 52 take up any slight irregularity. Such is the complete operation of the device. It is now ready for use.

Figure 7:
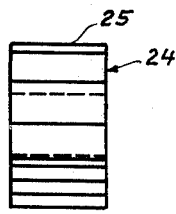
Figure 7 is a side view of the subject matter of Figure 6.
Figure 8:
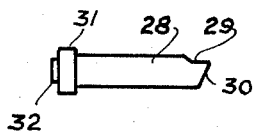
Figure 8 is a side elevation of a pawl such as I may employ.
Figure 9:
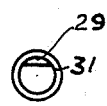
Figure 9 is an end view of Figure 8.

As previously stated it is possible to employ any desired positioning disc of this type with any desired clamp, either face of the clamp being positioned in operative relation to the work piece. As illustrated in Figure 4 the clamp of Figure 1 is employed but turned with face 42 instead of face 41 engaging the work piece W. Disc 61 corresponds generally to disc 11 except that it is equipped with a ratchet plate 63 having finely spaced teeth 64 thus providing a much greater number of possible adjustments. Pawls 67 similar to those of Figure 2 are provided and need not be described in detail. Their mounting is also similar, and the previous description will serve. As previously stated all that is necessary to change from one form of the invention to another is for a workman to knock out the pin 16, substitute another positioning disc and whatever clamp may be desired and knock the pin back into position. Any one of the clamping members of my said copending parent application may be employed with the single substitution of a single round opening for slots 33 and 34 and 83 and 84. Similarly if desired the polygonal positioning member such as shown in Figures 7 and 8 of my parent application may be employed if desired.

Figure 10:
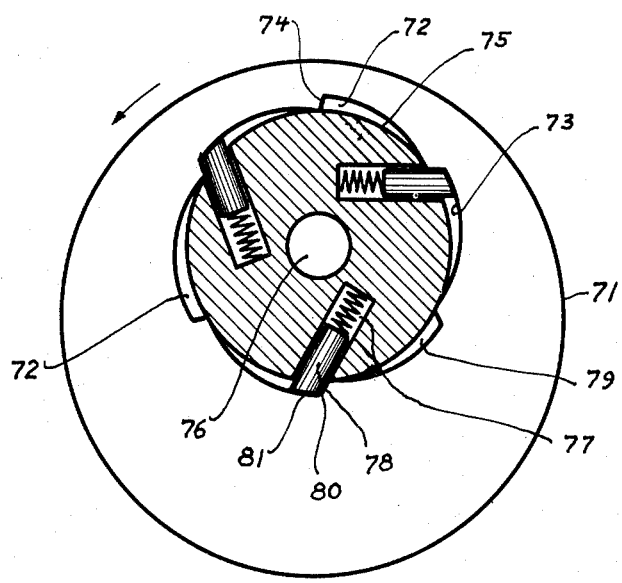
Figure 10 is a side elevation partly in section of a positioning disc showing a different and novel type of one-way clutch.
Figure 11:
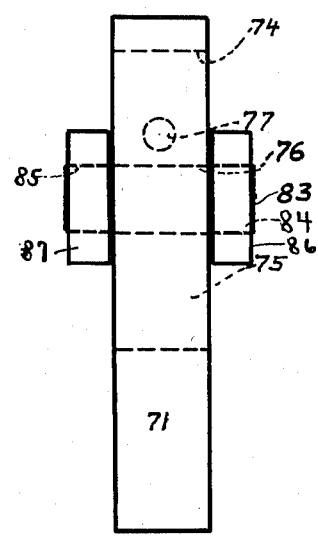
Figure 11 is an end view corresponding to Figure 10 but in addition showing a portion of a clamping bar and the pin which connects those parts.

As previously stated I may employ various types of one-way clutches. Another preferred clutch by means of which I may practice this invention is clearly shown in Figures 10 and 11.

I form a positioning disc 71 with a relatively large irregular opening 72 with its axis spaced from but parallel to that of the disc. The inner surface of this opening is formed into a plurality of cam shaped surfaces 73 each extending away from the center of the opening and to a stop or shoulder 74. Each of the shoulders extends from the end of its cam surface back toward the center and to a point at which the next cam surface begins. Thus the inside of this opening is formed into a series of circular wedge shaped openings, so to speak. Within this central opening I place a smaller latching disc 75 with a central opening 76 with its axis coincident with that of opening 72 formed in the positioning disc. A series of cylindrical control openings 77 extends from the edge of the latching disc therewithin. One of the bounding surfaces of each opening is adapted to align with a shoulder when the latching disc is positioned within the opening in the positioning member. A plunger 78 forced outwardly by a spring 79 is mounted within each of these control openings. One outer edge 80 of each of these plungers is formed to conform to the configuration of the shoulders and its end 81 to conform to the cam surface adjacent thereto.

A shaft 83 corresponding to shaft 16 is forced within opening 76 of the latching disc and into openings 84 and 85 in tines 86 and 87 of a fork in which a clamping member not shown but similar to 13 terminates. Thus latching disc 75 and the clamping bar are held against relative movement.

The operation of this form of my invention will be clear from the description which has preceded. The positioning disc may be turned counter-clockwise at will. Such movement will compress the respective springs 79 to permit the ends of the plunger 78 to ride along the cam surfaces with which they are engaged. At the inner end of each one of these surfaces each plunger will spring outwardly into the next wedge-shaped circular opening. An attempt to move the structure in contrary direction, however, will be blocked as soon as the outer edges of the plungers engage shoulders 74.

Figure 13:
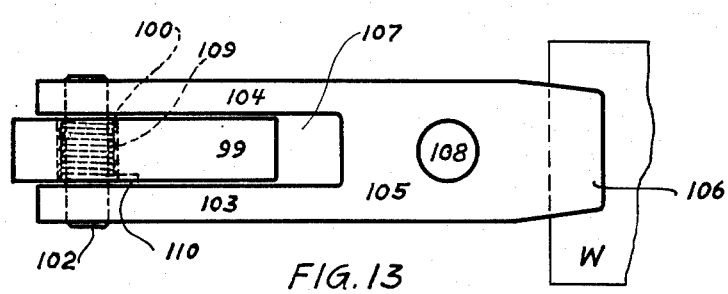
Figure 13 is a top plan view of the structure of Figure 12.
Figure 12:
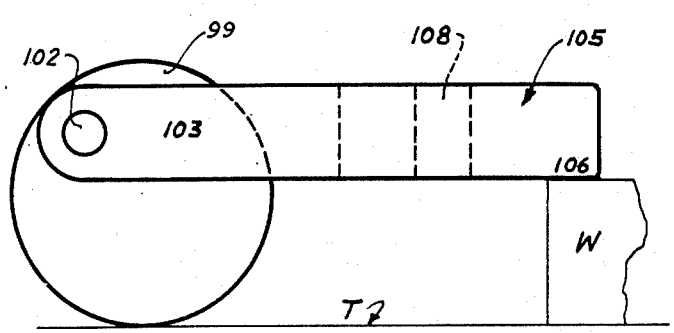
Figure 12 is a side elevation of another preferred embodiment of my invention making use of another novel arrangement which is particularly suitable for small and precision work.

Still another preferred embodiment of my invention will be clear from Figures 12 and 13. This form is particularly well adapted to light precision work such as that done by instrument makers, jewelers, and the like. A novel one-way clutch which I employ in this example of my invention has the great advantage of being almost instantly responsive. Although it permits free movement of a positioning disc in one direction it immediately blocks it from rotation in the other.

In this exemplification I employ a positioning disc 99 with a transverse cylindrical opening 100 parallel to the axis of the disc but spaced therefrom. A pin 102 is swedged within an opening in the branches 103 and 104 of a bifurcated end of a clamping member 105 which has a nose 106 which engages a work piece W. The disc 99 rides upon the pin in a vertical slot in an opening 107 between the tines of the bifurcation. A vertical opening 108 is provided to accommodate a holding member or bolt such as previously described.

The one-way clutch in this exemplification of my invention is most simple and effective. Its actuating element comprises a spring 109 one projecting end 110 of which is forced into an appropriate slot formed in the positioning disc and leading to transverse opening 100. The body of the spring is wound fairly tightly on a diameter only slightly greater than that of the central portion of pin 102. It will thus be evident that when positioning disc 9 is revolved in a counter-clockwise direction as viewed in Figure 13 the spring will not impede its movement but that rotation in the opposite direction will immediately cause the spring to grasp the pin and lock the structure in position. That is to say, a user may freely revolve disc 99 in a counter-clockwise direction to change the height of the pin 102 and hence the clamp 105 above the table T but movement in the contrary direction will cause the spring to grasp the pin and lock the structure.

In all forms of my clutches it will be noted that while a workman may freely rotate the positioning member, downward movement of the clamp cannot be communicated to the positioning member. Thus I provide a unitary work holder which may be instantly adjusted by hand to any one of a plurality of positions but when once so adjusted remains fixed in position. Then I provide instrumentalities which communicate rotation of the positioning disc to the clamping bar to change its height above the work table and instrumentalities to hold the positioning member locked against movement by the clamping bar.

The advantages of my invention will be clear from the foregoing specification, the drawings which are a part hereof, and the subjoined claims. These advantages include the provision of a simple inexpensive and efficient unitary work holder which when it is ready for use has no loose parts and can be instantly adjusted to any one of many different positions in each of which it holds work pieces of different sizes and configurations in rigid relation to the work table of a machine. These advantages also include the provision of such a unitary work holder including interchangeable positioning members of different characteristics and different reversible work-engaging formations thus providing great versatility.

I claim:

1. A positioning disc for use in a work holder, a first opening being formed in said disc with its axis parallel to the axis of said disc but spaced therefrom, said first opening being adapted for the reception of a ratchet disc, a second opening being formed in said disc in a plane normal to the axis of said first opening and communicating therewith, a toothed plunger disposed in said second opening, means for moving said plunger toward said first opening for advancing the tooth of said plunger to a point within said first opening whereby said tooth may cooperate with a tooth of the ratchet of said ratchet disc when said ratchet disc is disposed in said first opening, and means for limiting such movement.

2. A positioning disc for use in a work holder, a first opening being formed in said disc with its axis parallel to the axis of said disc but spaced therefrom, a second opening being formed in said disc in a plane normal to the axis of said first opening and communicating therewith, said second opening extending to the circumference of said disc, a toothed plunger mounted in the inner portion of said second opening and adapted to extend therefrom into said first opening, a spring disposed in said second opening between its junction with the circumference of said disc and said plunger, cooperating formations upon said plunger and said second opening for limiting the movement of said plunger toward said first opening, and means for retaining said spring within said second opening and forcing it against the outer end of said plunger.

3. In a work holder, a unitary positioning member having a surface adapted to engage a work table and to be rotated thereupon in relation to said table, said positioning member having therewithin an opening circular in cross section upon an axis spaced from and parallel to that of said positioning member, the cylindrical surface of said opening being shaped into cam formations each of which terminates in a stop, a holding disc disposed within said opening and revoluble therewithin, a spring-pressed plunger mounted for movement with and relatively to said holding disc and extensible in a direction normal to the axes of said discs into engagement with one of said cam formations and its stop, a clamping bar adapted to extend from a work piece to said member and having one or a first end adapted to engage the work piece and the other or second end adapted to cooperate with said positioning member, and means for attaching said second end of said clamping bar to said holding disc whereby said positioning disc is freely revoluble and upon an axis of said positioning member parallel to said surface which engages a work table in one direction with said plunger engaging one of said cam formations but held against revolution in the other direction by engagement of said plunger and one of said stops.

4. In a work holder, a unitary positioning disc having a surface adapted to engage a work table and to be rotated thereupon in relation to said table, said positioning disc having therewithin and opening circular in cross section upon an axis spaced from and parallel to that of said positioning disc, the cylindrical surface of said opening being shaped into cam formations each of which terminates in a stop, a holding disc disposed within said opening and revoluble therewithin, a spring-pressed plunger mounted within said holding disc and extensible in a direction normal to the axes of said discs into engagement with one of said cam formations and its stop, a clamping bar adapted to extend from a work piece to said member and having one or a first end adapted to engage the work piece and the other or second end bifurcated to receive said positioning disc, and a pin extending between the tines of the bifurcation and through said holding disc and being fixed to said holding disc and said tines whereby said positioning disc is freely revoluble in one direction with said plunger engaging one of said cam formations but held against revolution in the other direction by engagement of said plunger and one of said stops.

5. In a work holder, a unitary positioning disc the cylindrical surface of which is adapted to engage a work table and to be rotated thereupon in relation to said table, said positioning disc having therewithin an operating opening circular in cross section upon an axis spaced from and parallel to that of said positioning disc, the cylindrical surface of said operating opening being shaped into a plurality of cam formations each of which terminates in a stop, each of said stops having a surface angular to said opening and to the surface of the cam which forms a stop or shoulder, a holding disc disposed within said operating opening and revoluble therewithin, a plunger for each of said cam formations, each of said plungers being mounted within a control opening in said holding disc and being extensible in a direction normal to the axes of said discs into engagement with one of said cam formations and its stop and having one side which is parallel to the plane of said angular surface of said shoulder and adapted to engage it and having an inner end adapted to bear against cam formations, said holding disc being formed with such a plunger-holding control opening for each plunger, the plane of the axes of said openings being normal to the plane of those of said discs, a spring in each opening which bears against the end of the plunger opposite that which is engageable with said shoulder for urging said plunger toward said cylindrical surface of said operating opening, a stop formation for limiting such movement of each of said plungers, a clamping bar adapted to extend from a work piece to said member and having one or a first end adapted to engage the work piece and the other or second end bifurcated to receive said positioning disc, and a pin extending between the tines of the bifurcation and through said holding disc and being fixed to said holding disc and said tines whereby said positioning disc is freely revoluble in one direction with the end of each of said plungers engaging said cam formations but held against revolution in the other direction by engagement between the said side of each of said plungers and said stop.

6. In a work holder, a unitary positioning disc the cylindrical surface of which is adapted to engage a work table and to be rotated thereupon in relation to said table, said positioning disc having therewithin an opening which is circular in cross section and is formed upon an axis spaced from and parallel to that of said positioning disc, the cylindrical surface of said opening being shaped into a plurality of cam formations each of which terminates in a shoulder or stop, each of said shoulders being angular to said opening and to the adjacent portion of said cam formation, a holding disc disposed within said opening and revoluble therewithin, a plunger for each of said shoulders, each of said plungers being mounted within a plunger-receiving or control opening in said holding disc and being extensible in a direction normal to the axes of said discs into engagement with one of said cam formations and its shoulder and having one side which is parallel to the plane of said angular surface of said shoulder and adapted to engage said shoulder and be held thereby and having one end which is adjacent said side and adapted to engage and slide along said cam formation, said holding disc being formed with such an opening for each plunger, the axes of said openings being disposed in a plane normal to that of said axes of said discs, a spring in each of said control openings which presses against the end of each plunger opposite that which engages said cam formation for urging said plunger toward said cam formation, stop means for limiting movement of each of said plungers, a clamping bar one or a first end of which is adapted to engage and hold a work piece and another or second end of which is adapted to cooperate with said positioning disc, and means for mounting said holding disc upon the second end of said clamping bar.

7. For use in a work holder, a unitary positioning disc the cylindrical surface of which is adapted to engage a work table of a machine and to be rotated thereupon in relation to said table, said positioning disc having therewithin an opening circular in cross section formed upon an axis spaced from and parallel to that of said positioning disc, the cylindrical surface of said opening being shaped into cam formations each of which terminates in a shoulder or stop, a holding disc disposed within said opening and revoluble therewithin, and a spring-pressed plunger mounted within said holding disc and extensible in a direction normal to the plane of the axes of said discs and into engagement with one of said cam formations and its stop.

8. For use in a work holder, a unitary positioning disc the cylindrical surface of which is adapted to engage a work table of a machine and to be rotated thereupon in relation to said table, said positioning disc having therewithin an opening circular in cross section formed upon an axis spaced from and parallel to that of said positioning disc, the cylindrical surface of said opening being shaped into cam formations each of which terminates in a shoulder or stop, a holding disc disposed within said opening and revoluble therewithin, a plurality of spring-pressed plungers mounted in openings within said holding disc and extensible into engagement with one of said cam formations and its stop, said holding disc being formed with a control or plunger-receiving opening for each of said plungers, said control openings being disposed in planes normal to those of said axes of said discs and in such angular relation to said cam formations and said shoulders that the end of each of said plungers when extended engages one of said cam formations upon revolution of said holding disc in one direction and slides therealong and an adjacent side of said plunger engages one of said shoulders upon revolution of said holding disc in the opposite direction, and means for extending said plungers toward said cam formations.

9. For use in a work holder which includes a unitary positioning disc which is detachably connectable thereto, a clamping bar, said clamping bar including a holding disc, a plurality of spring-pressed plungers mounted in openings within said holding disc and extensible therefrom, said holding disc being formed with control or plunger-receiving openings for each of said plungers, said control openings being disposed in planes normal to those of the axis of said disc, means for extending said plungers toward the exterior of said holding disc, and means for fixing said holding disc to said clamping bar whereby when said bar is assembled with said disc, said plungers cooperate with formations thereupon.

10. In a work holder, a unitary positioning member having a surface adapted to engage a work table of a machine and to be rotated thereupon in relation to said table, a clamping bar adapted to extend from a work piece to said member and having one or a first end adapted to engage the work piece and the other or second end adapted to cooperate with said positioning member, a holding member attached to said table and adapted to be fixed to said clamping bar for preventing it from moving away from the surface thereof after it has been positioned at a predetermined distance therefrom following the revolution of said positioning member, and means for connecting said second end and said positioning member, said connecting means embodying a cylindrical formation fixed to said clamping bar upon which said positioning member is revoluble upon an axis parallel to said surface of said member which engages said work table and a wire spring wound about said cylindrical formation at a short distance from the surface thereof and having one end free and the other fixed to said clamping bar whereby said positioning member may be freely revolved upon said axis in one direction for predeterminedly positioning said clamping bar in relation to the surface of said table but is held against revolution in the other direction under the influence of said holding member after said clamp has been positioned and said holding member has been fixed thereto.

11. In a work holder, a unitary positioning disc the cylindrical surface of which is adapted to engage a work table of a machine and to be rotated thereupon in relation to said table, a clamping bar adapted to extend from a work piece to said member and having one or a first end adapted to engage the work piece and the other or second end adapted to cooperate with said positioning member, and means for attaching said second end to said positioning disc, said attaching means including a cylindrical formation fixed to said clamping bar adjacent said second end, said positioning disc being mounted for rotation upon said formation upon an axis parallel to but spaced from its own axis, and a spring surrounding said formation at a short distance therefrom with one end free and the other attached to said clamping bar.

12. In a work holder, a unitary positioning disc the cylindrical surface of which is adapted to engage a work table of a machine and to be rotated thereupon in relation to said table, a clamping bar adapted to extend from a work piece to said member and having one or a first end adapted to engage the work piece and the other or second end bifurcated and adapted to embrace said positioning disc, both of said tines being disposed in a plane parallel to the surface of said work table, and means for connecting said second end and said positioning disc after it has been placed in the fork of the bifurcation, said connecting means embodying a pin extending between the tines of said fork and fixed thereto and passing through said disc at a point other than its center, said disc being disposed between said tines and revoluble upon said pin, and a wire wound about said pin at a short distance from the surface thereof and having one end free and the other fixed to said clamping bar whereby said positioning member may be freely revolved in one direction but is held against revolution in the other direction.

13. For use in a work holder which includes a positioning disc the cylindrical surface of which is adapted to engage a work table of a machine and to be rotated thereupon in relation to said table, a clamping bar with one or a first end adapted to engage a work piece and the other or second end formed with a fork with a central horizontal slot adapted to receive said positioning member for revolution therewithin, a shaft passing through said fork and adapted to be fixed to both tines thereof and adapted to support said disc at a point other than the center thereof for revolution thereupon upon an axis parallel to the surface of said work table when said disc is in use thereupon, and a wire spring wound about said shaft at a short distance therefrom and having one end free and the other end fixed to said clamping bar whereby said positioning member may be freely revolved in one direction but is held against revolution in the other direction.

14. In a work holder for use with a machine; said machine having a work table and a holding member extending above said work table; said work holder having, in combination, a cylindrical unitary positioning disc the cylindrical edge of which forms a work surface which directly engages the work table of the machine and is rotatable thereupon in relation to said table, a clamping bar having one end adapted to engage a work piece and the other end directly joined to said positioning disc, said clamping bar being adapted for engagement by said holding member, and mechanism including a one way clutch directly attaching the end other than said first mentioned work-engaging end to said positioning disc at a point other than the center thereof for rotation of said disc upon an axis parallel to the surface of said work table, whereby rotational adjustment of said disc in one direction changes the distance between said work-engaging end of said clamping bar and said table and said one way clutch prevents reverse movement after said clamping bar has been adjusted.

15. In a work holder for use with a machine; said machine having a work table and a holding member extending above said work table; said work holder having, in combination, a cylindrical positioning disc, the cylindrical edge of which forms a surface adapted directly to engage the work table, a clamping bar extending between said positioning disc and a workpiece to be clamped on the work table, means providing a fulcrum for said bar and means cooperating between said positioning disc and the adjacent end of said bar including means mounting said disc on said end of said bar for rotation upon an axis parallel to and eccentric to the axis of said disc, said clamping bar being adapted for engagement by said holding member and means adapted to allow said disc to rotate in a direction to engage a work table and move said bar around its fulcrum to clamp the work and adapted to prevent reverse rotation of said disc to lock said holder in adjusted work clamping position.

16. In a work holder, a positioning disc, a narrow edge of which forms a surface adapted to engage a work table, a clamping bar extending between said positioning disc and a work-piece to be clamped on the work table, a holding member extending upwardly from said work table, means providing a fulcrum for said bar and means cooperating between said positioning disc and the adjacent end of said bar including means mounting said disc on said end of said bar for rotation upon an axis parallel to and eccentric to the axis of said disc, said holding member being adapted to engage and hold said clamping bar, and means adapted to allow said disc to rotate in a direction to engage a work table and move said bar around its fulcrum to clamp the work and adapted to prevent reverse rotation of said disc to lock said holder in adjusted work clamping position.

17. In a work holder, in combination, a unitary cylindrical positioning disc the cylindrical edge of which forms a work surface directly engaging a work table of a machine and rotatable thereupon in relation to said table, a clamping bar extending directly between a work piece and said disc with one or a first end adapted to engage the work piece and the other or second end directly connected to said positioning disc, and connective and motion-controlling mechanism allowing motion in one direction and locking against motion in the other direction and including a pivot, the longitudinal axis of said pivot being disposed parallel to said surface of said disc which engages the work table, attaching said second end of said clamping bar to said disc at a point other than the center thereof for eccentric rotation.

18. In a work holder for use with a machine having a holding member; said holding member having, in combination, a cylindrical positioning disc the cylindrical edge or work edge of which directly engages a work table of a machine and is rotatable thereupon in relation to said table, a clamping bar extending directly between a work piece and said disc with one or a first end adapted to engage the work piece, said clamping bar being adapted to engage the holding member of the machine, and connective mechanism for attaching said other or second end and said positioning disc at a point other than the center thereof and for rotation upon an axis parallel to said work table, said connective mechanism including a ratchet disc operatively mounted upon said clamping bar upon an axis parallel to but spaced from that of said positioning disc and a pawl fixedly mounted upon said positioning disc and engaging the teeth of said ratchet for limiting the rotation of said positioning disc to one direction.

19. In the combination of a work holder and a machine, a cylindrical positioning disc the cylindrical edge or work edge of which directly engages a work table of the machine and is rotatable thereupon in relation to said table, a clamping bar extending directly between a work piece and said disc with one or a first end adapted to engage the work piece, a holding member extending from said machine toward said clamping bar, means for fastening together said clamping bar and said holding member, and connective mechanism for attaching said other or second end of said clamping bar and said positioning disc at a point other than the center thereof and for rotation upon an axis parallel to said work table, said connective mechanism including a ratchet disc operatively mounted upon said clamping bar upon an axis parallel to but spaced from that of said positioning disc and a pawl fixedly mounted upon said positioning disc and engaging the teeth of said ratchet for limiting the rotation of said positioning disc to one direction.

20. In a work holder, a unitary cylindrical positioning disc the cylindrical edge of which forms a work surface which directly engages a work table of a machine and is rotatable thereupon in relation to said table, a clamping bar extending between a work piece and said disc with one or a first end adapted to engage the work piece and the other or second end bifurcated to embrace the sides of said positioning disc, and connective and motion-controlling mechanism allowing motion in one directon and locking against motion in the other direction for directly attaching said bifurcated end of said bar and said positioning disc, said mechanism including a pivot for said bar disposed between the tines of the fork of said bifurcation upon an axis parallel to said surface which engages a work table and being disposed other than at the center of said disc.

21. In a work holder, in combination, a cylindrical positioning disc the cylindrical edge of which forms a work surface which directly engages a work table and is rotatable thereupon in relation to said table, a clamping bar with a bifurcated end, the end of said clamping bar opposite its fork being adapted to engage a work piece, and a uni-directional motion-controlling connector for mounting said disc within said fork for rotation relatively thereto and upon an axis parallel to said surface which engages a work table, said uni-directional connector including a pivot passing through said fork and disc and including instrumentalities for limiting the rotation of said disc to one direction some of which are mounted upon said member and others of which are mounted upon said fork.

22. In a work holder, a cylindrical positioning disc the cylindrical edge or work surface of which directly engages a work table and is rotatable thereupon in relation to said table, a ratchet disc, said ratchet disc being mounted in a first or an operating opening therein for revolution upon an axis parallel to but spaced from that of said positioning member, said disc being formed with such an opening, a spring pressed pawl engaging the teeth of said ratchet, said pawl being mounted in a second or a control opening in said disc, said second opening being formed upon an axis normal to that of said operating opening, and communicating therewith, a clamping bar with a bifurcated end, forming a fork, the end of said clamping bar opposite its fork being adapted to engage a work piece, and a pin fixedly mounted within the branches of said fork and extending through said positioning disc and being fixed to said ratchet, said positioning disc being disposed between said branches and being rotatable upon said pin.

WALTER NIPKEN.

REFERENCES CITED

The following references are of record in the file of this patent:

UNITED STATES PATENTS

| Number | Name | Date |
|---|---|---|
| 142,697 | Holmes | Sept. 9, 1873 |
| 253,889 | Roberts | Feb. 21, 1882 |
| 348,306 | Willson | Aug. 31, 1886 |
| 603,025 | Lord | Apr. 26, 1898 |
| 651,706 | Forbes | June 12, 1900 |
| 1,801,222 | Cayo | Apr. 14, 1931 |
| 2,153,998 | Verderber et al. | Apr. 11, 1939 |
| 2,349,087 | Fraser | May 16, 1944 |
| 2,499,408 | Nipken | Mar. 7, 1950 |

FOREIGN PATENTS

| Number | Country | Date |
|---|---|---|
| 139,124 | Great Britain | Feb. 26, 1920 |
| 544,508 | Great Britain | Apr. 16, 1942 |